March 3, 1953  C. W. HEWLETT, JR  2,630,540
VARIABLE RELUCTANCE TUNED CIRCUIT ALTERNATING CURRENT
MOTOR AND METHOD OF OPERATING THE SAME
Filed Aug. 3, 1951
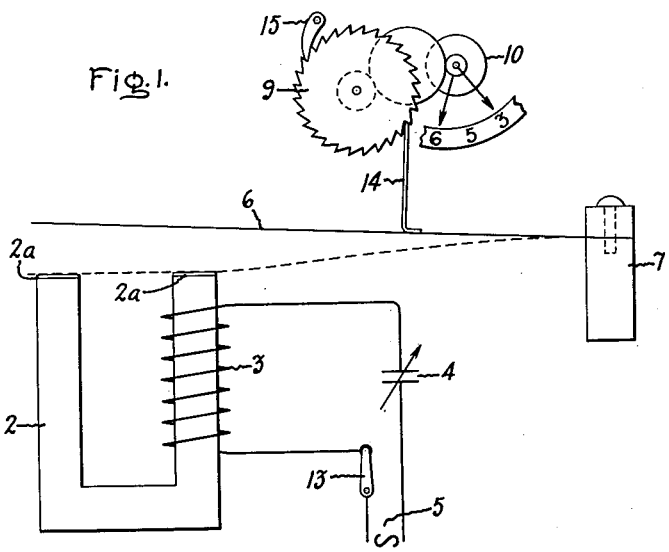
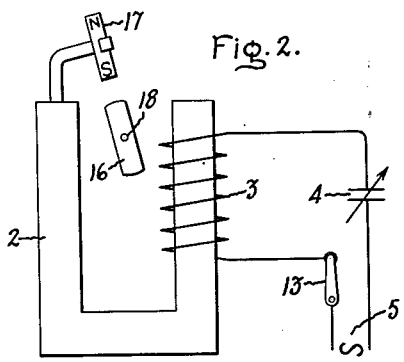
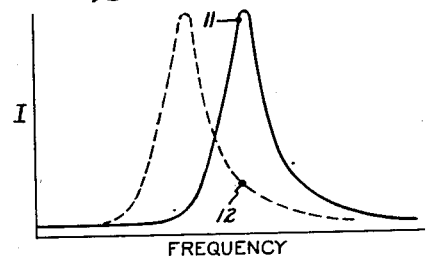
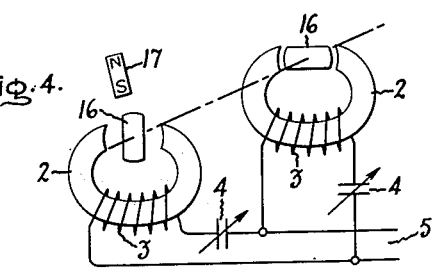
Inventor:
Clarence W. Hewlett, Jr,
by Russell A. Warner
His Attorney.

Patented Mar. 3, 1953

2,630,540

UNITED STATES PATENT OFFICE 2,630,540

VARIABLE RELUCTANCE TUNED CIRCUIT ALTERNATING CURRENT MOTOR AND METHOD OF OPERATING THE SAME

Clarence W. Hewlett, Jr., Marblehead, Mass., assignor to General Electric Company, a corporation of New York Application August 3, 1951, Serial No. 240,107

3 Claims. (Cl. 310—112)

My invention relates to alternating current motors of the type having a magnetic armature which, when the motor is in operation, varies the reluctance of the motor. The motor is further provided with an energizing circuit which is tuned to resonance for a high reluctance position of the armature and is detuned for a low reluctance position of the armature. When the motor energizing circuit is in resonance, the armature is caused to be attracted by the motor flux from a high reluctance position to a low reluctance position to thus detune the energizing circuit and, in effect, practically de-energize the motor and reduce its flux which allows the armature to again move to a high reluctance tuned resonant circuit position to, in effect, re-energize the motor. This action is repeatedly indefinitely, causing operation of the motor at a constant or variable rate depending upon conditions to be explained but having no particular relation to the frequency of the source of supply. The armature of the motor may have rotary motion or a reciprocating motion and, in the latter case, may have a natural constant rate of vibration.

It is the object of my invention to provide a low-cost, trouble-free, reliable motor suitable for a variety of applications where a small motor is needed.

The features of my invention which are believed to be novel and patentable will be pointed out in the claims appended hereto. For a better understanding of my invention reference is made in the following description to the accompanying drawing in which Fig. 1 represents an embodiment of my invention where in the armature has a reciprocating or vibrating motion. Fig. 2 represents an embodiment of the invention where the armature has a rotary motion. Fig. 3 represents a current resonance curve that will be referred to in explaining the operation. Fig. 4 shows an advantageous combination of two motors driving a single shaft.

Referring to Fig. 1, 2 represents a stationary magnetic circuit including an armature air gap. The magnetic material is preferably laminated and comprises the stator core of the motor. Wound thereon is an energizing winding 3 energized through a circuit containing a condenser 4 from an alternating current supply 5. The motor armature consists of a resilient magnetic reed 6 having one end fixed at 7 and its free end projecting across but spaced from the open end or air gap of the U-shaped stator core. The unrestrained position of the armature is approximately as represented in full lines, and its attracted restrained position is approximately as illustrated in dotted lines. In operation it may move upward slightly beyond the full line position. The up and down movement of the armature 6 is represented as for driving a ratchet wheel 9 and since, as will be explained, the armature will vibrate at its natural rate of vibration, this rate will therefore be constant and the ratchet wheel may therefore drive a small constant load such as the clock 10 represented. To give a practicable example, the armature 6 may have a natural rate of vibration of 15 cycles per second.

The motor circuit 5 is to be energized at a substantially constant voltage and frequency and at a frequency well above the natural rate of vibration of the armature, and for the example given the source of supply 5 may have a frequency of 720 cycles per second. The fact that 15 is evenly divisible into 720 in the example given has no significance and is unnecessary. A frequency of 710 cycles per second for the source of supply 5 would do just as well. Now the motor circuit is tuned as by use of the condenser 4 so that when the armature is in the detracted position shown, the energizing circuit of the motor will be in resonance or approximately in resonance such that the energizing current will be substantially a maximum for the circuit conditions, and be at a point well up on the resonant current frequency curve of Fig. 3, for example, at point 11. This heavy current in winding 3 produces a large flux in the magnetic circuit 2 and attracts the magnetic armature 6 towards the position shown in dotted lines. This reduces the reluctance of the magnetic circuit comprising core 2 and armature 6 and increases the reactance of coil 3 in the tuned circuit. This increase in reactance of the coil detunes the circuit by reason of the unequal amounts of capacitative and inductive reactance therein at the given frequency of 720 cycles per second. In order for the circuit to be in resonance with this increased value of reactance in the coil, the frequency would have to be decreased appreciably as indicated by the lower frequency dotted line resonance curve. However, the frequency is constant and as a result the current in the circuit drops to a low value such as the value at point 12, Fig. 3. This reduces the flux in the magnetic circuit and the attraction on armature 6, and it moves upward and away from the core due to the spring tension therein. This again decreases the reactance in the energizing circuit, it approaches more nearly to a condition of resonance, the current therein increases, the flux in core 2 increases, and the armature 6 is again attracted towards core 2. After a few oscillations the magnitude of the vibration of armature 6 builds up at its natural rate of vibration, the current differential between the tuned and detuned conditions increasing with the armature vibration magnitude until a maximum steady-state condition exists and continues indefinitely until the motor is stopped as by opening the energizing circuit by a switch 13. As soon as the armature vibrations have been built up to a steady-state condition, it can drive a light load without interference with its operation, and thus I have represented a ratchet wheel 9 being driven by the armature 6 as it moves in one direction. It will be evident that by properly spacing the ratchet teeth in wheel 9 in relation to the throw of the ratchet 14 fixed to armature 6, the wheel will be advanced one tooth per oscillation and that if during a motor starting period the magnitude of armature vibration is not sufficient to drive the load, the load will be removed by reason of the pawl 15 preventing backward rotation of wheel 9. Thus the motor when being started is relieved of its load if that is necessary during the first few build-up oscillations.

It will be evident that the rate of oscillation of the armature will be constant at its normal rate of vibration and independent of the frequency of the source of supply, and that minor variations in the source of supply frequency will have no effect so long as they are insufficient to result in an appreciable loss of motor torque due to a change in the circuit tuning condition because of a change in frequency. The motor described is operative over a frequency range from 700 to 740 cycles. Sharp tuning to obtain the maximum current change with armature position is desirable and hence a relatively high frequency is recommended. The condenser 4 may be made variable as indicated to adjust for the best differential current condition with the armature in attracted and detracted operating positions, and to modify the circuit tuning condition for different frequencies of the source of supply.

Voltage variations will influence the motor torque but not its rate, and the motor may be designed for sufficient torque in relation to its load so as to allow for an ample factor of safety in this respect. The particular motor described will operate on four volts and 720-cycle power, but it will not operate on 115 volts and 60-cycle power. If, however, there is sufficient 720-cycle harmonic present in the 60-cycle power, the motor will operate. For example, the motor will operate on a power source of 110 volts 60 cycles plus four volts of 720 cycles. Hence, it will be evident that the motor may be used for carrier current relay purposes by superimposing a small 720-cycle voltage on a 60-cycle system whenever it is desired to operate the motor as a relay. While the motor circuit as above described was tuned to resonance at 720 cycles, the same principles apply if the circuit of the motor be tuned to resonance at some other frequency. Thus, I may provide a plurality of such relays on a 60-cycle power line, some having circuits tuned to resonance at 720 cycles, others having circuits tuned to resonance at 800 cycles, etc., and operate these relays selectively by selectively superimposing on the system low voltage carrier currents of the corresponding resonant frequencies. Likewise, the different relays may have different natural rates of vibration by changes in the weight and length of the armature 6. The air gap ends of core 2 may be covered with a resilient nonmagnetic material such as rubber as represented at 2a to prevent the possibility of direct contact between the armature and core.

In Fig. 2, I have represented a modification of my invention where the armature rotates to change the reluctance of the magnetic circuit. Parts similar or equivalent to those of Fig. 1 are represented by like reference characters. It is evident that when the elongated magnetic armature 16 of Fig. 2 is horizontal or extends between the pole pieces of the core 2, the reluctance of the magnetic circuit will be a minimum and corresponds to the condition explained in connection with Figs. 1 and 3 when the armature 6 is in attracted position. When the armature 16, Fig. 2, is in a vertical position, the reluctance of the magnetic circuit of the motor is a maximum and corresponds to the conditions explained in connection with Figs. 1 and 3 when the armature 6 is in detracted position.

In case the armature 16, Fig. 2, is stationary and in the minimum reluctance position between the pole pieces when the switch 13 is closed to energize the motor, the motor will not start and it will be necessary to give it a spin or move it to a different rotary position where it can develop torque. To make this motor definitely self-starting, I have provided a small permanent magnet 17 adjacent the armature 16 and located so that when the armature 16 is free to do so, it will be attracted to a torque developing rotary position by such permanent magnet as represented in Fig. 2. Now, when the switch 13 is closed, the motor magnetic circuit will be near its high reluctance condition, and the motor current and flux will be near their maximum values with the circuit near resonance. Hence, there will be torque on the rotor tending to turn it counterclockwise so as to align itself between the stator 2 pole pieces. This torque is made sufficient with respect to the relatively weak pull of permanent magnet 17 to be effective in starting the motor. As the rotor aligns itself between the stator pole pieces, it produces the now reluctance, low flux, low current detuned condition previously explained, and the momentum of the rotor carries it by the pole pieces and through another high torque position where the armature is in a reversed position to that first assumed and where it receives another predominating motor torque impulse in the counterclockwise direction and as a result starts and continues in operation. By positioning the magnet 17 more to the right such that the adjacent end of the rotor would be inclined to the right instead of to the left as shown in its stationary condition, the motor would be self-starting in a clockwise direction.

The rotor 16 is connected to a shaft 18 and is able to drive a load connected thereto. This rotary armature of course does not have a natural rate of vibration and hence its speed of rotation will depend largely upon the load and the voltage of the source of supply. However, the tuned circuit operating principles previously described apply. Its speed has no particular relation to the frequency of the source of supply. I have built a small motor such as described and with a 720-cycle source of supply have obtained successful operation over a range of from 1000 to 3000 R. P. M. by varying the voltage.

It is seen that I have provided a method of operating a variable reluctance type motor in which the magnetic armature in its operation acts as a sort of magnetic commutator to vary the motor energization between maximum and minimum values at points in the armature cycle of movement to magnify the useful torque and minimize the retarding torque. Thus the magnetic commutator increases the motor energization and flux when the armature is in a position where the increased flux will produce useful torque, and it decreases the motor energization and flux when the armature is in a position where the flux would retard operation.

A somewhat analogous result has been obtained in prior art motors by opening and closing the motor energizing circuit at such opportune times by means of an expensive and troublesome mechanical commutator and brush arrangement. It will be obvious that two or more motors like that of Fig. 2 may be advantageously combined with their rotors on the same shaft but angularly displaced so that their torque pulses will occur at different times during a revolution as represented in Fig. 4.

What I claim as new and desire to secure by Letters Patent of the United States is:

1. A variable reluctance motor comprising a U-shaped stator magnetic core providing an armature air gap therein, a magnetic armature member mounted for rotation in said air gap, said armature having an elongated magnetic axis such that when rotated in said air gap it varies the reluctance across the gap between maximum and minimum values, an energizing winding on said core, an energizing circuit for said winding adapted to be energized from a substantially constant frequency source of supply, capacitance included in said energizing circuit which tunes the circuit to a condition of substantial resonance when the armature is in its maximum reluctance rotary position, thereby causing a high energizing current, high air gap flux and torque on said rotor causing it to turn to a low reluctance position, said energizing circuit becoming detuned when the rotor is in its minimum reluctance position to such an extent as to reduce the energizing current and air gap flux to a point that the motor is continuously rotatively operative.

2. A motor according to claim 1 in which a small permanent magnet is provided adjacent the armature to position the armature in a favorable starting position, and for a given direction of rotation.

3. A plurality of motors each of the character claimed in claim 1, with their armatures secured to the same shaft, said motors having their maximum reluctance armature positions angularly offset from each other.

CLARENCE W. HEWLETT, Jr.

REFERENCES CITED

The following references are of record in the file of this patent:

UNITED STATES PATENTS

| Number    | Name    | Date           |
|-----------|---------|----------------|
| 1,712,377 | Chirol  | May 7, 1929    |
| 1,970,333 | Muehter | Aug. 14, 1934  |
| 2,305,407 | Crago   | Dec. 15, 1942  |